US012776494B2

(12) United States Patent
Kim et al.

(10) Patent No.: US 12,776,494 B2
(45) Date of Patent: Oct. 27, 2026

(54) CURRENT COLLECTOR FOR ELECTRODE

(71) Applicant: U&S ENERGY, INC., Cheonan-si (KR)

(72) Inventors: Kyung Joon Kim, Daejeon-si (KR); Seung Ho Choi, Sejong-si (KR); Young Hun Jin, Cheonan-si (KR)

(73) Assignee: U&S ENERGY, INC., Cheonan-si (KR)

( * ) Notice: Subject to any disclaimer, the term of this patent is extended or adjusted under 35 U.S.C. 154(b) by 558 days.

(21) Appl. No.: 18/549,609

(22) PCT Filed: Mar. 7, 2022

(86) PCT No.: PCT/KR2022/003208

§ 371 (c)(1),
(2) Date: Sep. 8, 2023

(87) PCT Pub. No.: WO2022/203243

PCT Pub. Date: Sep. 29, 2022

(65) Prior Publication Data

US 2024/0297310 A1 Sep. 5, 2024

(30) Foreign Application Priority Data

Mar. 23, 2021 (KR) ........................ 10-2021-0036979

(51) Int. Cl.

| | |
|---|---|
| ***H01M 4/66*** | (2006.01) |
| ***H01M 50/583*** | (2021.01) |
| ***H01M 50/586*** | (2021.01) |

(52) U.S. Cl.

CPC ........... *H01M 4/667* (2013.01); *H01M 4/661* (2013.01); *H01M 50/583* (2021.01); *H01M 50/586* (2021.01); *H01M 2200/103* (2013.01)

(58) Field of Classification Search

CPC ....... H01M 10/653625; H01M 10/643; H01M 10/65; H01M 10/6557; H01M 10/60; H01M 50/383; H01M 50/211; H01M 50/367; H01M 50/503; H01M 50/507

See application file for complete search history.

(56) References Cited

U.S. PATENT DOCUMENTS

| | | | | |
|---|---|---|---|---|
| 9,478,781 | B2 * | 10/2016 | Ahn | H01M 50/46 |
| 10,923,728 | B1 | 2/2021 | Zeng | |
| 2005/0284750 | A1 | 12/2005 | Nishimura et al. | |
| 2020/0168888 | A1 * | 5/2020 | Lahiri | H01M 10/058 |
| 2020/0373584 | A1 | 11/2020 | Morin et al. | |

FOREIGN PATENT DOCUMENTS

| | | | |
|---|---|---|---|
| JP | 05-314994 | A | 11/1993 |
| JP | 2004-253351 | A | 9/2004 |
| JP | 2004-253356 | A | 9/2004 |
| JP | 2009-059571 | A | 3/2009 |

(Continued)

*Primary Examiner* — Stephen J Yanchuk

(74) *Attorney, Agent, or Firm* — NKL LAW; Jae Youn Kim

(57) ABSTRACT

A current collector for an electrode according to an embodiment of the present invention may include a base film, and a conductive material provided on at least one of upper and lower surfaces of the base film, in which the conductive material is divided into two or more parts in a length or width direction of the base film.

13 Claims, 18 Drawing Sheets

(56) References Cited

FOREIGN PATENT DOCUMENTS

| | | | |
|---|---|---|---|
| JP | 2017-157334 | A | 9/2017 |
| KR | 10-2005-0094825 | A | 9/2005 |
| KR | 10-2006-0068426 | A | 6/2006 |
| KR | 10-2014-0131115 | A | 11/2014 |
| KR | 10-2020-0099314 | A | 8/2020 |
| WO | 2016/121965 | A1 | 8/2016 |
| WO | 2020/022699 | A1 | 1/2020 |
| WO | 2020/159218 | A1 | 8/2020 |
| WO | 2022/108204 | A1 | 5/2022 |

* cited by examiner

CURRENT COLLECTOR FOR ELECTRODE

TECHNICAL FIELD

The present invention relates to a current collector for an electrode, and more particularly, to a current collector for an electrode, which is capable of improving safety of a battery by preventing overheating of the battery by exhibiting an electrochemical fuse function or a physical fuse function by removing a part of a metallic conductive material provided on a base film to induce a short circuit in only a part of the battery and block a short-current current path in the remaining part in the event of a short circuit.

BACKGROUND ART

As technical research and demands for mobile devices increase, there are rapidly increasing demands for secondary batteries as energy sources. Among the secondary batteries, lithium secondary batteries have been commercially available and have high energy density and action potential and a low self-discharge rate.

A secondary lithium metal battery is the first secondary battery that has been commercially available. The secondary lithium metal battery uses lithium metal as a negative electrode. However, the secondary lithium metal battery has a problem in that a lithium dendrite formed on a surface of a lithium metal negative electrode causes expansion of volume of a cell, gradual deterioration in capacity and energy density, a short circuit caused by consistent growth of the dendrite, a decrease in cycle lifespan, and deterioration in cell stability (explosion and ignition). For this reason, the production of the secondary lithium metal battery was stopped in a just few years after the secondary lithium metal battery was commercially available. Therefore, there has been used a carbon-based negative electrode that is more suitable than lithium metal and can store lithium in an ionic state in a lattice or vacant space. The use of the carbon-based negative electrode allows the lithium secondary battery to be properly commercially available and come into wide use.

The lithium secondary battery is mainly made of carbon-based or non-carbon-based negative electrode materials up to now. The development of the negative electrode material is mostly focused on carbon-based materials (graphite, hard carbon, soft carbon, etc.) and non-carbon-based materials (silicon, tin, titanium oxide, etc.).

Meanwhile, recently, as portable electronic devices and information communication devices are miniaturized, the lithium secondary battery is significantly expected to be used as an ultra-small power system for operating the devices.

Moreover, recently, research and development have been actively conducted on polymer-based electronic devices and elements using advantages such as flexibility, low cost, and ease of manufacturing. Therefore, to use the miniaturized device, it is necessary to reduce a thickness or weight of the battery while maintaining energy density or performance of the lithium secondary battery.

In addition, even though the thickness or weight of the lithium secondary battery is reduced, a current path needs to be blocked or destroyed in the event of a short circuit in order to improve safety of the lithium secondary battery.

In particular, in the case of a high-capacity lithium secondary battery capable of storing energy of 2 Ah or more, there is an acute need for a battery safety technology that may reduce or block a short-circuit current in the event of a short circuit.

The present applicant proposes the present invention to solve the above-mentioned problems.

DISCLOSURE

Technical Problem

The present invention has been made in an effort to solve the above-mentioned problems, and an object of the present invention is to provide a current collector for an electrode, which is capable of having a reduced thickness or weight in comparison with a current collector made of metal foil and serving as a fuse in the event of an internal short circuit or an external short circuit, thereby preventing an increase in temperature and improving stability of a battery.

The present invention has also been made in an effort to provide a current collector for an electrode, in which in a large-scale lithium secondary battery, a short-circuited part is isolated or separated from the other parts in the event of a short circuit, such that the entire current collector for an electrode may be prevented from reacting with the short circuit, and the other part of the current collector for an electrode, except for the short-circuited part, may operate normally.

Technical Solution

To achieve the above-mentioned object, an embodiment of the present invention provides a current collector for an electrode, the current collector including: a base film; and a conductive material provided on at least one of upper and lower surfaces of the base film, in which the conductive material is divided into two or more parts in a length or width direction of the base film.

The conductive material may include a recessed portion formed over the entire conductive material in the length or width direction of the base film, and the conductive material may not be formed in the recessed portion.

The conductive material may include a conductive portion formed alternately with the recessed portion in the length or width direction of the base film, and the conductive material may be present in the conductive portion.

The conductive portion and the recessed portion may be formed symmetrically or asymmetrically on the upper and lower surfaces of the base film.

The base film may be made of a transparent material.

The current collector may include a metal piece or a lead tab provided in a direction intersecting the conductive portion and the recessed portion and provided to be in contact with the entire conductive portion.

The current collector may include an insulating polymer layer provided between the conductive portion and the metal piece or the lead tab.

The insulating polymer layer may be melted by heat and attach the metal piece or the lead tab to the conductive portion, and a portion excluding the melted part may insulate a portion between the conductive portion and the metal piece or the lead tab.

An electrical connection between the conductive portion and the lead tab or the metal piece may be implemented only at a molten point formed as the insulating polymer layer is melted, a portion of the insulating polymer layer, which is not melted, may insulate the portion between the conductive portion and the lead tab or the metal piece, the molten point may be formed to be smaller than the portion of the insulating polymer layer that is not melted, and a current path may be formed through the molten point.

When a short circuit occurs in any one of the plurality of conductive portions separated by the recessed portions, the current path, which is formed through the molten point formed as the insulating polymer layer being in contact with the short-circuited conductive portion is melted, may be blocked, such that the short circuit does not affect the other conductive portions, except for the short-circuited conductive portion.

When a short circuit occurs in any one of the conductive portions, the short-circuited conductive portion may be electrically separated from another conductive portion by the recessed portions formed at two opposite sides of the corresponding conductive portion.

The plurality of conductive portions, which is distinguished by the recessed portions, may be connected in parallel to the metal piece or the lead tab so that the recessed portions, which are formed at two opposite sides of the short-circuited conductive portion, prevent the short circuit from affecting another conductive portion.

A stepped portion, which has a smaller thickness of the conductive material than the conductive portion, may be formed in the conductive portion at one side of the metal piece or the lead tab.

Advantageous Effects

The current collector for an electrode according to the present invention uses the base film made of a nonconductor instead of metal foil, and the conductive material is formed, as a coating or plating layer, on the surface of the base film. Therefore, it is possible to reduce the thickness in comparison with the current collector having the metal foil.

According to the current collector for an electrode according to the present invention, the current collector for an electrode of the short-circuited part is isolated from the other parts and the current in the short-circuited part is blocked in the event of a short circuit. Therefore, it is possible to reduce the portion of the current collector for an electrode that is associated with the short circuit.

According to the current collector for an electrode according to the present invention, the plurality of separated current collectors for an electrode has a structure equivalent to a shape in which the current collectors are electrically connected in parallel to the lead tab. Therefore, only the short-circuited separated current collector for an electrode may be separated, and the current may be blocked, such that the other parts of the current collector for an electrode may be continuously used, thereby improving the safety and increasing the lifespan of use.

According to the current collector for an electrode according to the present invention, only the short-circuited part, among the plurality of separated current collectors for an electrode, may be induced to be short-circuited, and the other parts, which are not short-circuited, may perform the electrochemical fuse function or the physical fuse function in order to block the short-current current path, thereby preventing overheating of the battery and improving the safety of the battery.

BEST MODE

Figure 1:
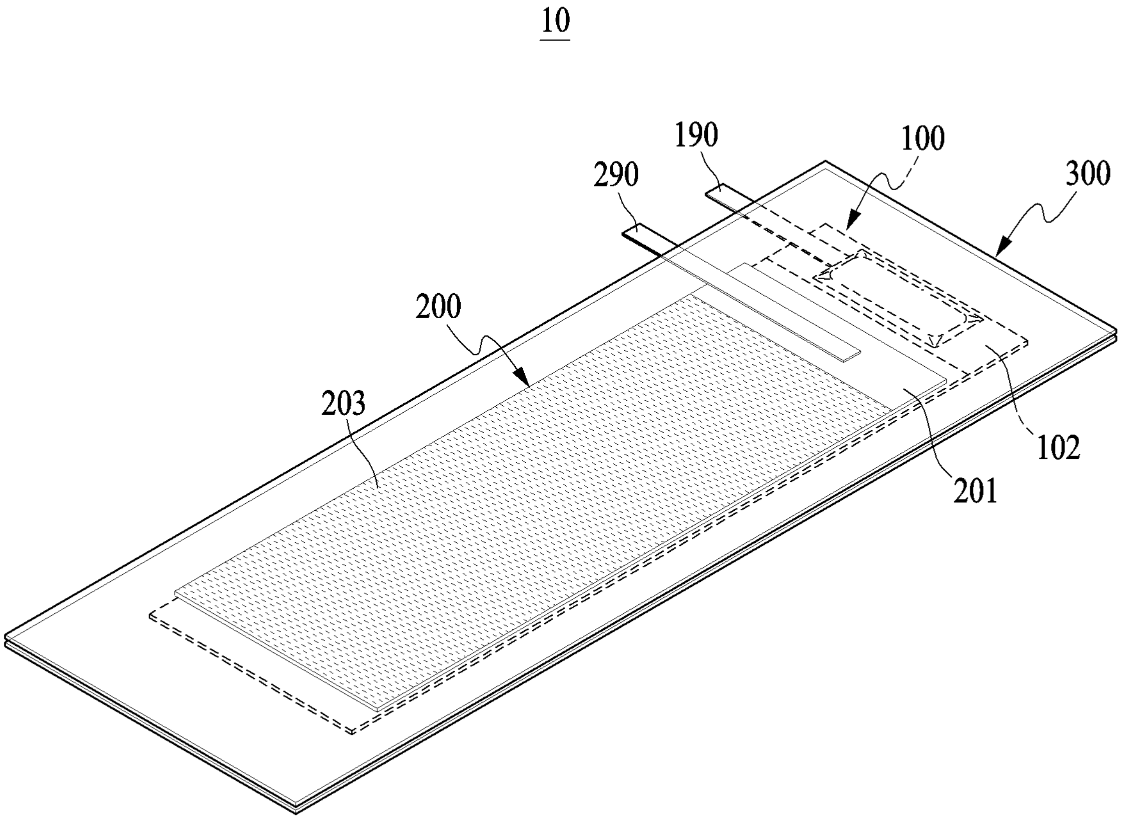
FIG. 1 is a perspective view illustrating an electrode assembly including a current collector for an electrode according to an embodiment of the present invention.

Hereinafter, embodiments according to the present invention will be described in detail with reference to the accompanying drawings. However, the present invention is not restricted or limited by the embodiments. Like reference numerals indicated in the respective drawings refer to like members.

Figure 2:
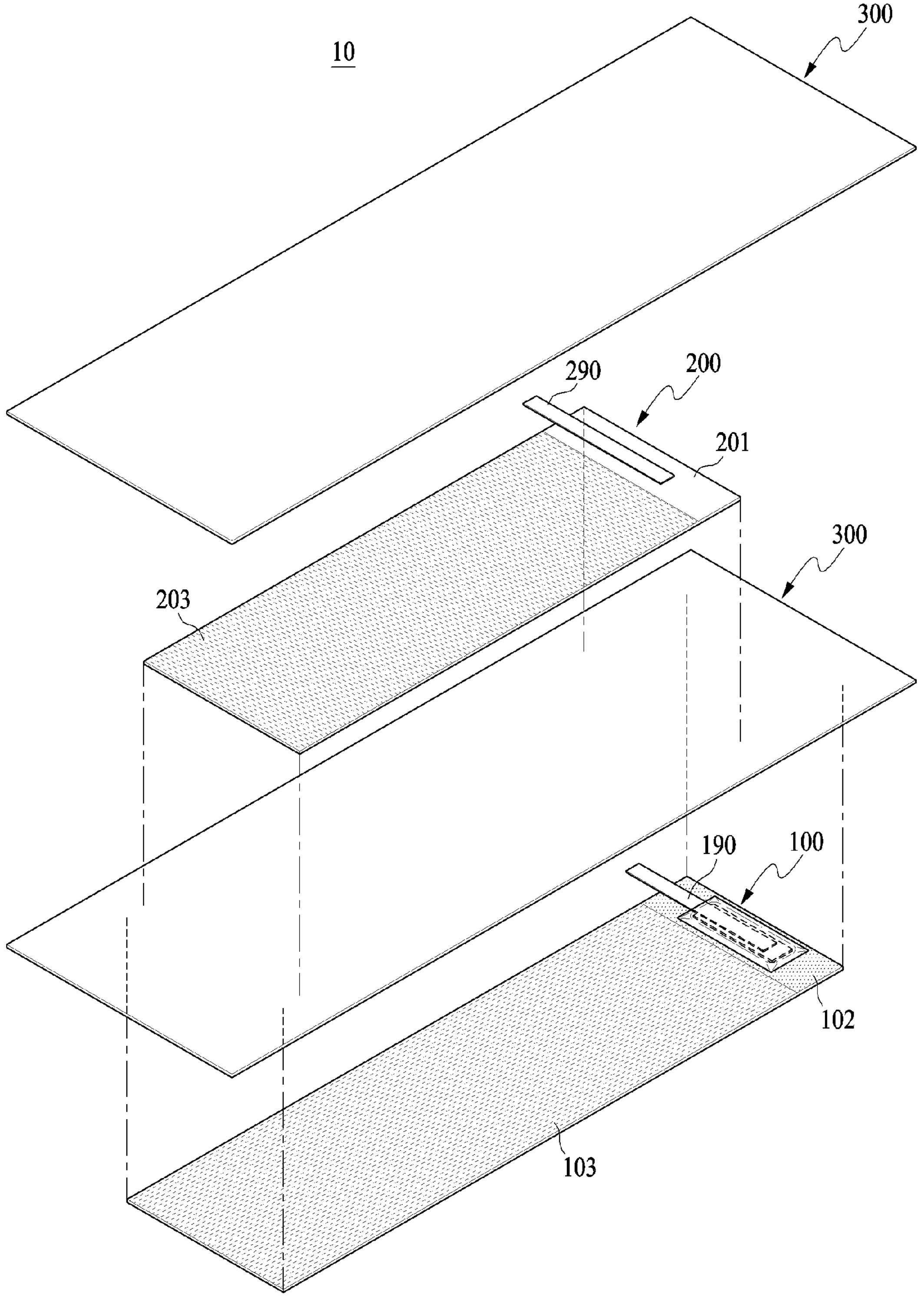
FIG. 2 is an exploded perspective view illustrating the electrode assembly according to the embodiment of the present invention.
Figure 3:
FIG. 3 is a top plan view illustrating a state in which a metal piece and a lead tab are attached to the current collector for an electrode according to the embodiment of the present invention.
Figure 4A:
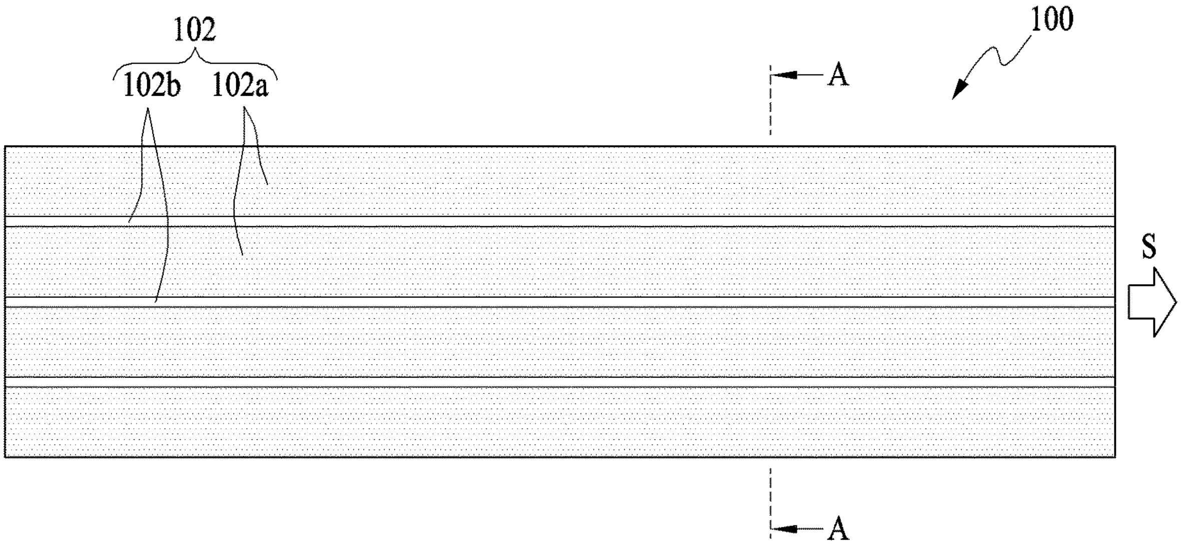
FIGS. 4A and 4B are a top plan view and a cross-sectional view illustrating the current collector for an electrode according to FIG. 3.
Figure 4B:
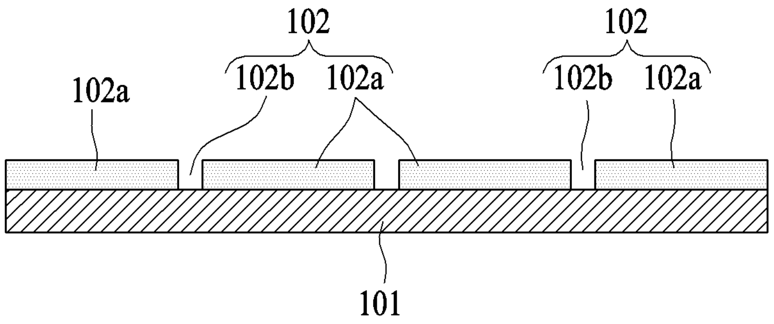
Figure 5A:
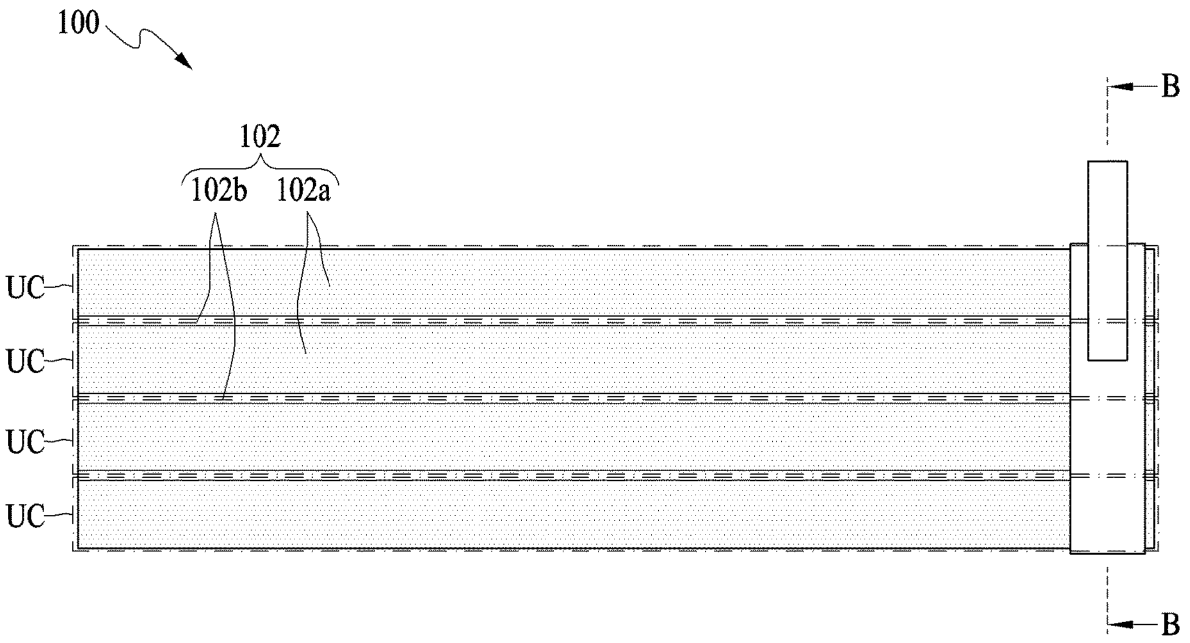
FIGS. 5A and 5B are a top plan view and a cross-sectional view for explaining a function of the current collector for an electrode to which the metal piece and the lead tab according to FIG. 3 are attached.
Figure 5B:
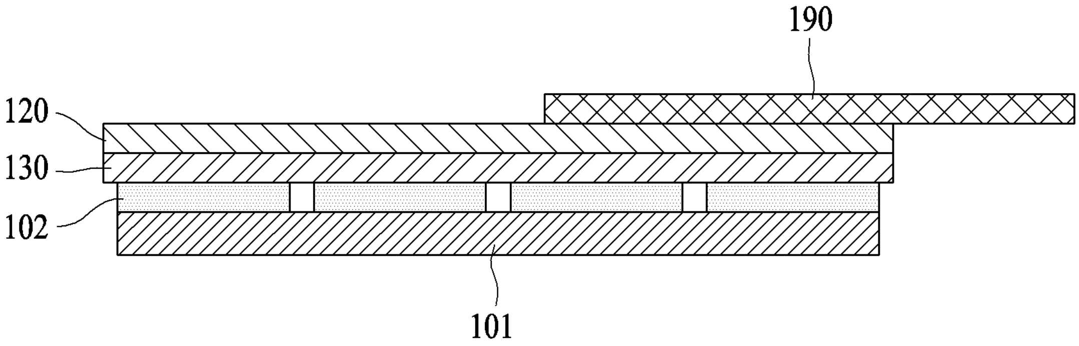
Figure 6A:
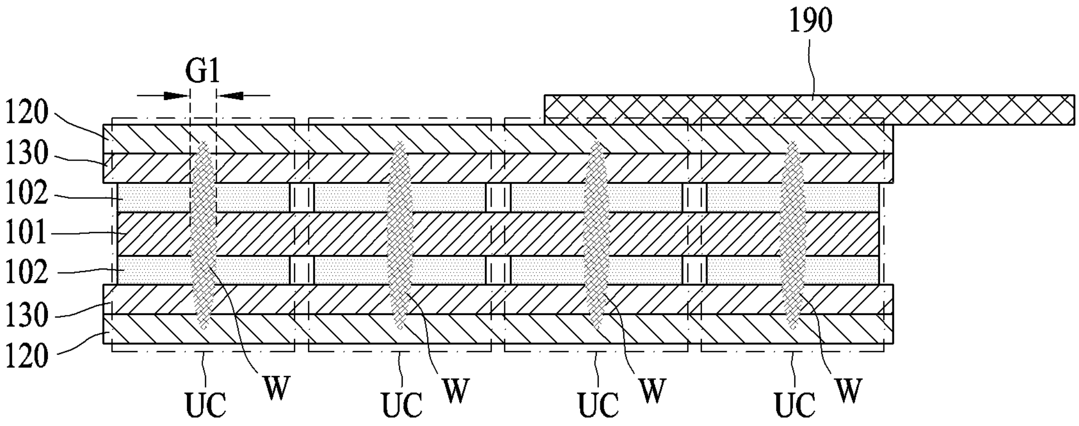
FIGS. 6A and 6B are views for explaining states in which the metal piece and the lead tab are welded to the current collector for an electrode according to FIGS. 5A and 5B.
Figure 6B:
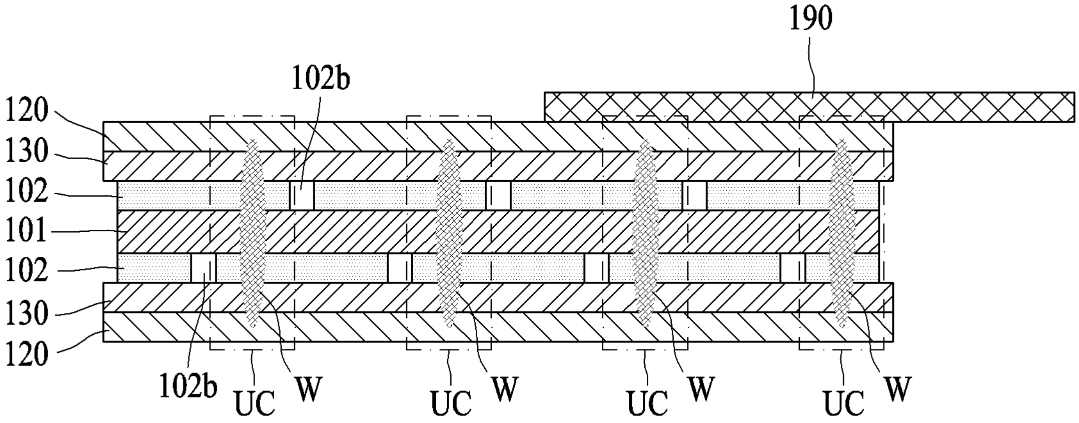
Figure 7A:
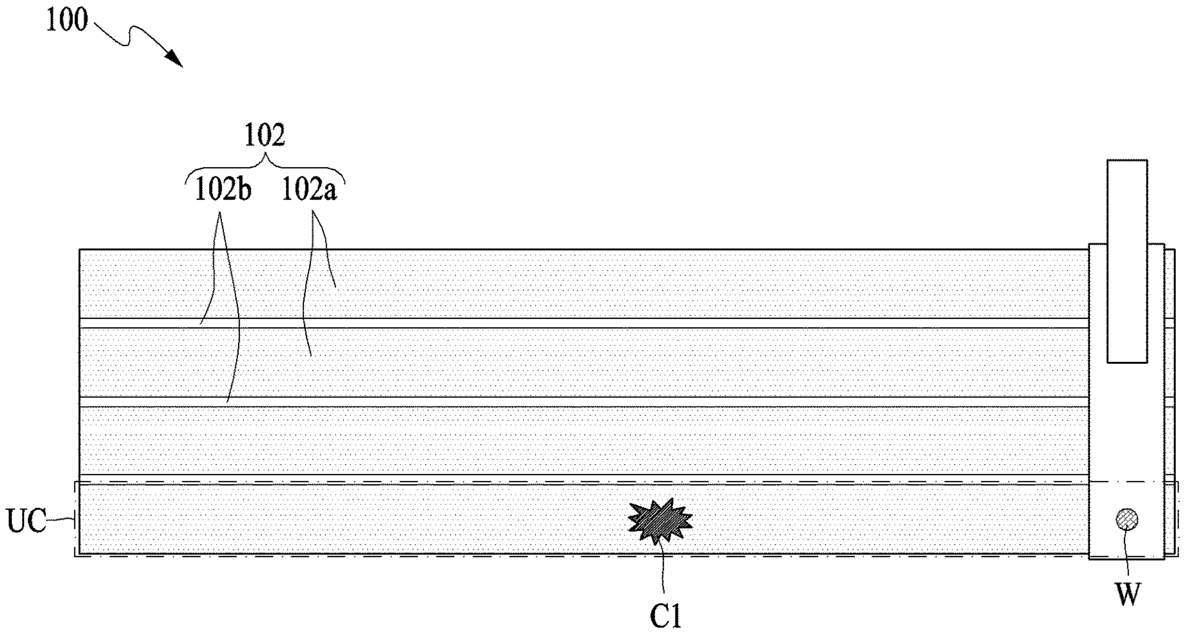
FIGS. 7A and 7B are views for explaining a case in which the current collector for an electrode, to which the metal piece and the lead tab according to FIGS. 6A and 6B attached, is short-circuited.
Figure 7B:
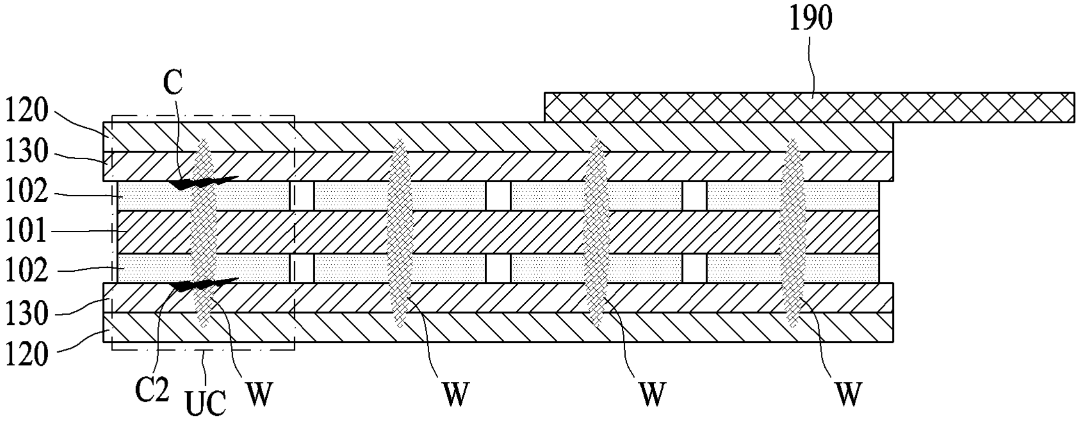
Figure 8:
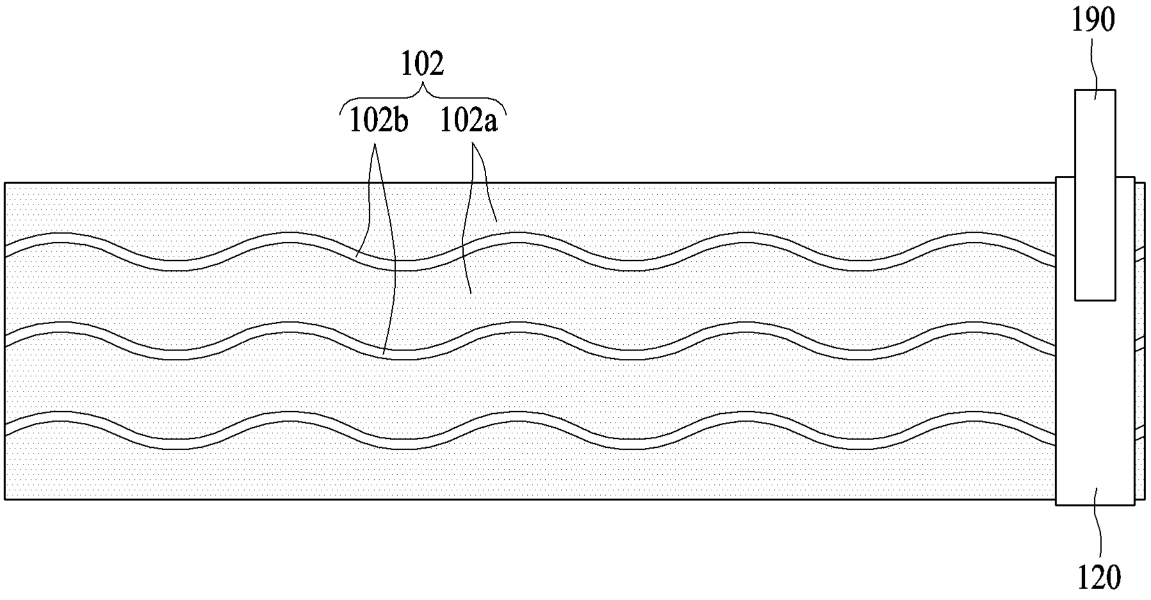
FIG. 8 is a top plan view illustrating a modified example of the current collector for an electrode illustrated in FIG. 3.
Figure 9:
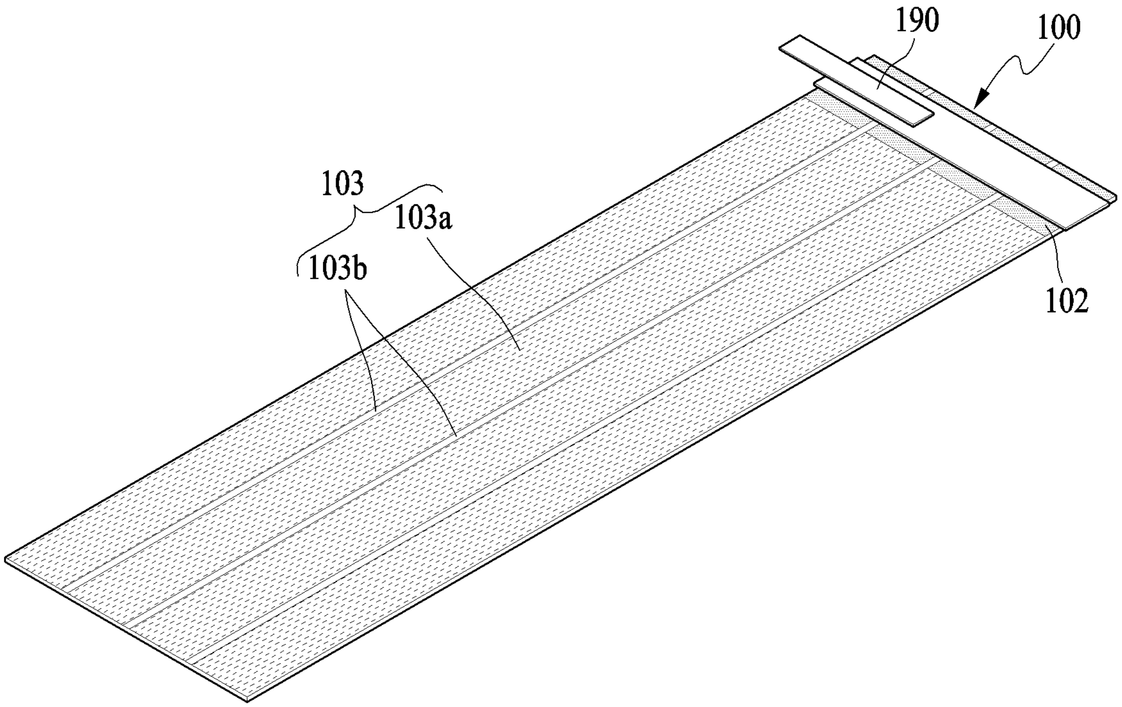
FIG. 9 is a perspective view illustrating a current collector for an electrode according to another embodiment of the present invention.
Figure 10:
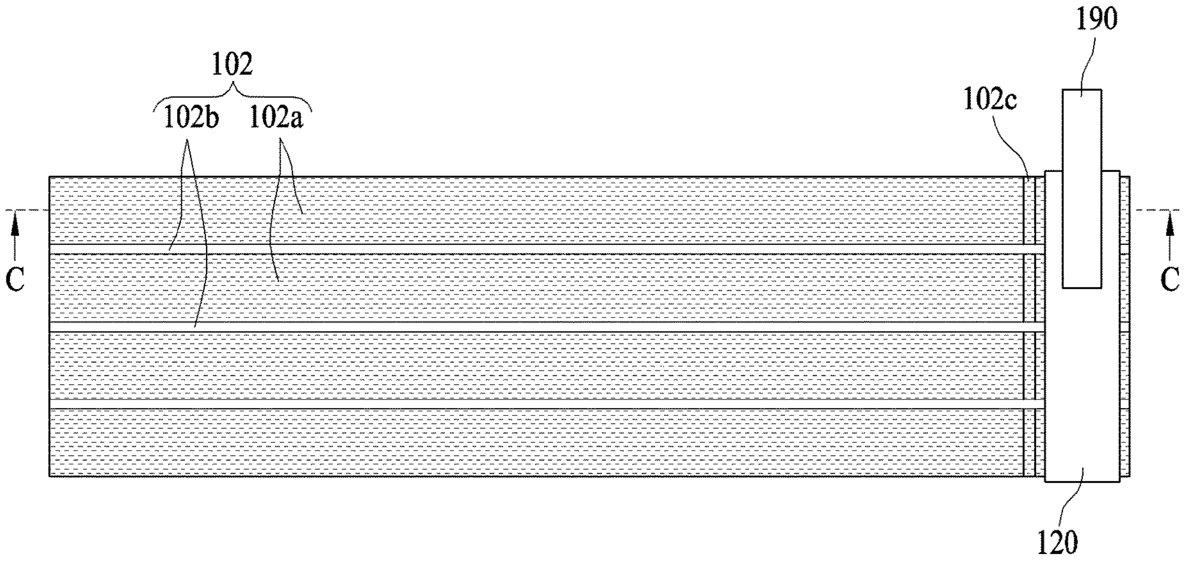
FIG. 10 is a top plan view illustrating a current collector for an electrode according to still another embodiment of the present invention.
Figure 11A:
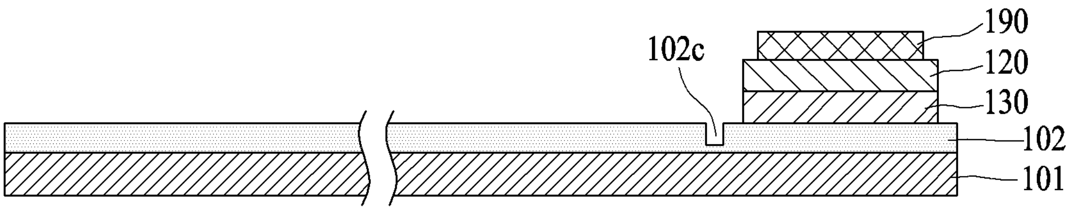
FIGS. 11A and 11B are cross-sectional views taken along cutting line C-C in FIG. 10.
Figure 11B:
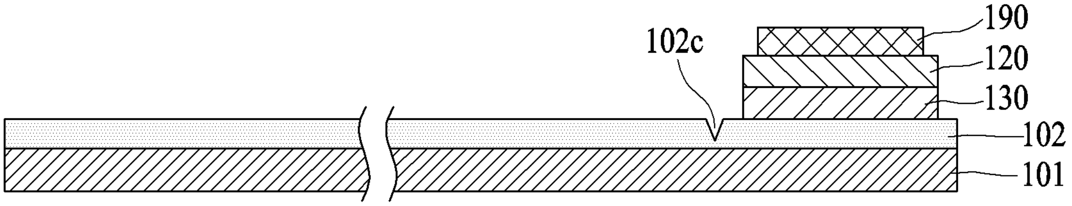

FIG. 1 is a perspective view illustrating an electrode assembly including a current collector for an electrode according to an embodiment of the present invention, FIG. 2 is an exploded perspective view illustrating the electrode assembly according to the embodiment of the present invention, FIG. 3 is a top plan view illustrating a state in which a metal piece and a lead tab are attached to the current collector for an electrode according to the embodiment of the present invention, FIGS. 4A and 4B are a top plan view and a cross-sectional view illustrating the current collector for an electrode according to FIG. 3, FIGS. 5A and 5B are a top plan view and a cross-sectional view for explaining a function of the current collector for an electrode to which the metal piece and the lead tab according to FIG. 3 are attached, FIGS. 6A and 6B are views for explaining states in which the metal piece and the lead tab are welded to the current collector for an electrode according to FIGS. 5A and 5B, FIGS. 7A and 7B are views for explaining a case in which the current collector for an electrode, to which the metal piece and the lead tab according to FIGS. 6A and 6B attached, is short-circuited, FIG. 8 is a top plan view illustrating a modified example of the current collector for an electrode illustrated in FIG. 3, FIG. 9 is a perspective view illustrating a current collector for an electrode according to another embodiment of the present invention, FIG. 10 is a top plan view illustrating a current collector for an electrode according to still another embodiment of the present invention, and FIGS. 11A and 11B are cross-sectional views taken along cutting line C-C in FIG. 10.

FIGS. 1 and 2 illustrate an electrode assembly 10 including a current collector 100 for an electrode according to the present invention. The current collector 100 for an electrode according to the present invention illustrated in FIGS. 1 and 2 is a positive electrode current collector. Hereinafter, a positive electrode means a cathode and a negative electrode means an anode. For example, a positive electrode current collector means a cathode current collector, and a negative electrode current collector means an anode current collector. A surface of the current collector 100 for a positive electrode needs to be coated with a positive electrode active material 103 (refer to FIG. 2) so that the current collector 100 for an electrode is used for the electrode assembly 10.

Meanwhile, a negative electrode current collector 200 may have a negative electrode metal foil 201 coated with a negative electrode active material 203, and a negative electrode lead tab 290 may be connected to one end of the negative electrode current collector 200 based on a length direction of the negative electrode current collector 200.

A separator 300 may be disposed between the negative electrode current collector 200 and the current collector 100 for an electrode (the positive electrode current collector) according to the present invention. In a state illustrated in FIG. 2, the electrode assembly 10 illustrated in FIG. 1 is made as the negative electrode current collector 200 and the positive electrode current collector 100 are sequentially stacked with the separator 300 interposed therebetween.

Hereinafter, for convenience of description, the positive electrode current collector 100 will be referred to as the current collector for an electrode.

FIGS. 3 and 4A and 4B illustrate the current collector 100 for an electrode according to the embodiment of the present invention. The current collector 100 for an electrode does not use metal foil unlike the negative electrode current collector 200 described above.

The current collector 100 for an electrode according to the embodiment of the present invention has a larger resistance value than resistance of the current collector using the metal foil, such that the current collector 100 may adjust a limit current value of the current flowing in the current collector. Because the flow of current may be hindered by damage to a base film, the current collector 100 may reduce a short-circuit current or prevent heat generation in the event of an internal short circuit of the secondary battery.

The lithium secondary battery having the current collector 100 for an electrode according to the present invention may have properties or concept of a max current limited battery (MCLB). Hereinafter, the current collector for an electrode according to the present invention, which enables implementation of the MCLB, will be described.

The current collector 100 for an electrode according to the embodiment of the present invention is the positive electrode current collector. Because the current collector 100 has a higher resistance value than the resistance of the positive electrode current collector of the battery in the related art, i.e., the positive electrode current collector using the metal foil, the current collector 100 may adjust the limit current and reduce the short-circuit current and heat generation occurring in the event of a short circuit by blocking or destroying a current path in the event of the internal short circuit, thereby improving the safety of the battery.

The current collector 100 for an electrode according to the embodiment of the present invention has a base film 101 as a basic material without using metal foil. The current collector 100 is characterized in that the base film 101 is applied or coated with metal with a small thickness.

With reference to FIGS. 3 and 4A and 4B, the current collector 100 for an electrode according to the embodiment of the present invention may include the base film (polymer film) 101, and a conductive material 102 provided on at least one of upper and lower surfaces of the base film 101.

In this case, in the event of a short circuit, the conductive material 102 may serve as an electrochemical fuse, such that the conductive material 102 may have a function of preventing a short circuit. The electrochemical characteristics of the conductive material 102 will be described below.

The base film 101 may be provided in the form of a band having a predetermined length. In this case, the base film 101 may be made of a nonconductive polymer material such as polyethylene (PE), polypropylene (PP), polybutylene terephthalate (PBT), polyimide (PI), or polyethylene terephthalate (PET).

The base film 101 may have a thickness of 50 μm or less, particularly, a thickness of 1.4 μm or more and 50 μm or less. The current collector 100 for an electrode according to the embodiment of the present invention may reduce a thickness or weight of the battery in comparison with a case in which the current collector using the metal foil in the related art is used. The current collector 100 uses the non-conductive base film 101, which has a thickness of 1.4 μm or more and 50 μm or less, as a basic configuration of the current collector 100, which makes it possible to reduce an overall thickness or weight of the lithium secondary battery having the current collector 100 for an electrode according to the embodiment of the present invention.

With reference to FIGS. 3 and 4A and 4B, the current collector 100 for an electrode according to the embodiment of the present invention may include the base film 101, and the conductive material 102 provided on the surface of the base film 101.

In case that the current collector 100 for an electrode is the positive electrode current collector, the conductive material 102 may be aluminum (Al) metal. The conductive material 102 may be referred to as a conductive layer that defines an outermost surface of the current collector 100 for an electrode.

The conductive material 102 may be formed to adjust or reduce a limit current or maximum current of the current collector 100 for an electrode. In other words, the conductive material 102 is aluminum metal with which a concavely recessed surface or a convexly protruding surface of the base film 101 is plated or coated to control conductivity of the electrode current collector 100. The conductive material 102 may also be referred to as a conductive layer when the description is focused on a state in which the conductive material 102 is deposited or applied onto the surface of the base film 101. Hereinafter, it is noted that the conductive material 102 has the concept including the conductive layer.

It is possible to control or reduce the maximum amount of current flowing in the current collector 100 for an electrode by adjusting the amount of coating or a coating thickness of the conductive material 102 with which the surface of the base film 101 is plated (coated) or which is deposited on the surface of the base film 101. Therefore, it is possible to improve the safety of the lithium secondary battery and ensure the safety of the battery in the event of a short circuit.

In other words, the limit current or the maximum current flowing in the current collector 100 for an electrode may be adjusted depending on the thickness or the amount of the conductive material 102 formed on the surface of the base film 101. As described above, the conductive material 102 of the current collector 100 for an electrode according to the embodiment of the present invention may implement properties or concept of the max current limited battery (MCLB) of the lithium secondary battery.

In addition, in the event of a physical internal short circuit or an external short circuit, the base film 101 may be melted and hinder rapid current generation, thereby improving safety of the battery.

The conductive material 102 may be formed on the surface of the base film 101 in various ways. For example, aluminum metal, which is the conductive material 102, may be formed on the surface of the base film 101 by sputtering or evaporation coating. Because aluminum is easily oxidized, it is not easy to form the conductive material 102 on the surface of the base film 101 by electroplating.

It is possible to control the conductivity of the current collector 100 for an electrode or ensure safety of the battery depending on the amount (weight) or thickness of the conductive material 102 with which the surface of the base film is coated. Therefore, it is necessary to use a method capable of controlling or adjusting the thickness or weight of the conductive material 102.

The conductive material 102 may be formed on only one surface of the base film 101 or both of the two opposite surfaces of the base film 101. In this case, the conductive material 102 may have a thickness of 0.3 μm based on a minimum cross-section and a thickness of 2.5 μm based on a maximum cross-section.

In the current collector 100 for an electrode according to the embodiment of the present invention, the flow of current may be implemented by the conductive material 102. Therefore, the state in which the surface of the base film 101 is coated with the conductive material 102 needs to be properly maintained. To this end, the base film 101 may be subjected to surface treatment, thereby increasing a binding force between the conductive material 102 and the base film 101.

If the binding force between the conductive material 102 and the base film 101 is low, the conductive material 102 may be detached or separated from the surface of the base film 101 in a state in which the electrolyte is injected. Therefore, it is important to increase the binding force between the conductive material 102 and the base film 101.

The surface treatment may be performed on the surface of the base film 101 to increase a bonding force or binding force with the conductive material 102.

The surface of the base film 101 may be subjected to corona treatment to increase the binding force between the conductive material 102 and the base film 101.

Meanwhile, the current collector 100 for an electrode according to the embodiment of the present invention is a current collector used as the positive electrode of the secondary battery and may improve the safety of the secondary battery, unlike the current collector having the metal foil in the related art. This is because the conductive material 102 formed or applied onto the base film 101 serves to block the short-circuit current, like a fuse.

In general, when an internal short circuit or an external short circuit occurs in the secondary battery, heat is generated as a temperature of the secondary battery is increased by the short-circuit current, which causes a risk that the generated heat causes explosion of the battery. In contrast, even though an internal short circuit or an external short circuit occurs in the secondary battery that uses the current collector 100 for an electrode according to the embodiment of the present invention as the positive electrode, it is possible to prevent the temperature of the secondary battery from increasing and ensure the safety of the battery by blocking the short-circuit current.

The conductive material 102 formed or applied onto the base film 101 serves as a current path. When the conductive material 102 is broken into fine pieces while reacting with the electrolyte in the event of a short circuit, the current path is blocked, such that the short-circuit current does not flow any further.

Meanwhile, in the current collector 100 for an electrode according to the embodiment of the present invention, the conductive material 102 may be divided into two or more parts in a length or width direction of the base film 101. In FIGS. 4A and 4B, the arrow S indicates a transfer or length direction of the base film 101. The width direction of the base film 101 means one of horizontal and vertical directions in which a relatively short length is defined.

With reference to FIGS. 4A and 4B, the conductive material 102 may include recessed portions 102*b* formed on the entire conductive material 102 in the length or width direction of the base film 101, and conductive portions 102*a* formed alternately with the recessed portions 102*b*. FIGS. 4A and 4B illustrate that the conductive portion 102*a* and the recessed portion 102*b* of the conductive material 102 are formed in the length or transfer direction S of the base film 101.

In this case, the conductive material 102 is not formed in the recessed portion 102*b*, and the conductive material 102 is present in the conductive portion 102*a*.

FIG. 4A is a top plan view illustrating a state in which the recessed portion 102*b* and the conductive portion 102*a* are formed in the length direction of the base film 101, and FIG. 4B is a cross-sectional view taken along cutting line A-A in FIG. 4A.

The recessed portion 102*b* formed in the conductive material 102 may be formed by applying or depositing the conductive material 102 on the entire upper or lower surface of the base film 101 and then cutting the conductive material 102 by using a laser or patterning the conductive material 102. That is, the recessed portion 102*b* may be formed by forming the conductive material 102 on the base film 101 and then removing a portion, which is intended to be formed as the recessed portion 102*b*, by using a laser.

Meanwhile, in some instances, the recessed portion 102*b* may be formed by using a chemical material or a chemical substance, which reacts with aluminum metal that is the conductive material 102, without using a laser.

If the base film 101 is made of a transparent material, laser beams used to form the recessed portion 102*b* may pass through the base film 101. As illustrated in FIGS. 6A and 6B, the recessed portion 102*b* may be formed by emitting laser beams toward the conductive material 102 formed on the upper surface of the base film 101, in a state in which the conductive material 102 is formed on the upper and lower surfaces of the base film 101, i.e., two opposite surfaces of the base film 101, and removing the conductive material 102 at the portion to which the laser beams are emitted. In this case, because the conductive material 102 is not present at the portion where the recessed portion 102*b* is formed, the base film 101 is present on the bottom of the recessed portion 102*b*. The laser beams emitted to the bottom of the recessed portion 102*b* pass through the base film 101 made of a transparent material and reach the conductive material 102 formed on the lower surface of the base film 101. Therefore, the recessed portion 102*b* is also formed in the conductive material 102 formed on the lower surface of the base film 101. In this case, the recessed portions 102*b*, which are formed at upper and lower sides based on the base film

101, are disposed symmetrically and aligned in shape and position with each other. In addition, likewise, the conductive portions 102*a*, which are formed at the upper and lower sides, are also disposed symmetrically and aligned in shape and position with each other (see FIG. 6A).

If the base film 101 is not made of a transparent material, the laser beams cannot pass through the base film 101. Therefore, the laser beams need to be independently emitted to the conductive materials 102 respectively formed on the upper and lower surfaces of the base film 101. In this case, the conductive portions 102*a* and the recessed portions 102*b*, which are respectively formed at the upper and lower sides, may be disposed asymmetrically without being aligned in shape and position with each other (see FIG. 6B).

As described above, the conductive material 102 may include the recessed portion 102*b* formed in the length or width direction of the base film 101 and formed such that the conductive material is not present over the entire conductive material 102. The conductive material 102 may include the conductive portion 102*a* formed alternately with the recessed portion 102*b* in the length or width direction of the base film 101. Unlike the recessed portion 102*b*, the conductive material 102 is present in the conductive portion 102*a*.

In addition, the conductive portions 102*a* and the recessed portions 102*b* may be formed symmetrically or asymmetrically on the upper and lower surfaces of the base film 101. In case that the base film 101 is made of a transparent material that may transmit the laser beams, the conductive portions 102*a* and the recessed portions 102*b* may be formed symmetrically.

As illustrated in FIGS. 5A and 5B, the current collector 100 for an electrode according to the embodiment of the present invention may include a metal piece (metal element) 120 or a lead tab 190) disposed in a direction intersecting the conductive portion 102*a* and the recessed portion 102*b* and provided to be in contact with the entire conductive portion 102*a*.

With reference to FIGS. 5A and 5B, the conductive portion 102*a* and the recessed portion 102*b* may be formed in the length or transfer direction of the base film 101, whereas the metal piece 120 may be disposed in the width direction of the base film 101. In contrast, the lead tab 190 may be provided in the same direction as the metal piece 120 or provided in the direction in which the recessed portion 102*b*, i.e., the conductive portion 102*a* are formed.

The conductive portion 102*a* of the conductive material 102 may be positioned between the base film 101 and the metal piece 120.

Because the conductive portions 102*a* of the conductive material 102 are separated from one another by the recessed portions 102*b*, there is a need for a means for electrically connecting all the conductive portions 102*a*. The metal piece 120 may serve to connect all the conductive portions 102*a*. Therefore, the metal piece 120 needs to be provided at a position or formed in a shape so that the metal piece 120 may be in contact with all the conductive portions 102*a* separated from one another by the recessed portions 102*b*.

The metal piece 120 may be disposed in the width direction of the base film 101 so as to be in contact with all the conductive portions 102*a*. As illustrated in FIGS. 5A and 5B, the metal piece 120 may be provided in the vertical direction in case that the conductive portion 102*a* and the recessed portion 102*b* are provided in the horizontal direction. However, the metal piece 120 need not be necessarily disposed in the vertical direction, and the metal piece 120 only needs to be disposed to be in contact with all the conductive portions 102*a* even when the metal piece 120 is disposed obliquely.

Meanwhile, the metal piece 120 may be positioned on two opposite surfaces of the base film 101 or positioned on the surface of the base film 101, which is opposite to the surface to which the lead tab 190 is attached, and the lead tab 190 may be connected to the metal piece 120 by welding the lead tab 190. The lead tab 190 cannot be coupled in case that the base film 101 is not melted at a temperature lower than a welding temperature of the lead tab 190. Therefore, the base film 101 needs to have a melting point at which the base film 101 may be melted during the process of welding the lead tab 190.

As illustrated in FIGS. 5A and 5B, the metal piece 120 may be provided only on any one of the two opposite surfaces of the base film 101. Alternatively, as illustrated in FIGS. 6A and 6B, the metal piece 120 may be provided on both the two opposite surfaces of the base film 101.

The metal piece 120 may serve to ensure a position on the base film 101 at which the lead tab 190 is welded. That is, the metal piece 120 may serve as a connection part of the lead tab 190.

The metal piece 120 may have a thickness of 5 μm or more.

As described above, the metal piece 120 may be provided in the form of a thin metal film or metal foil having a thickness of 5 μm or more, but the shape of the metal piece 120 is not necessarily limited thereto. That is, the metal piece 120 may be provided in the form of a thin film, foil, or mesh.

The metal piece 120 may be configured as aluminum foil or SUS 316L foil.

With reference to FIGS. 5A and 5B and 6A and 6B, the current collector 100 for an electrode according to the embodiment of the present invention may have the lead tab 190 configured to be connected to the external device.

In the case of the electrode current collector using the metal foil in the related art, the lead tab may be welded directly to the metal foil. In contrast, in the case of the current collector for an electrode according to the embodiment of the present invention, the base film 101 corresponds to the metal foil in the related art. For this reason, the lead tab cannot be welded directly to the base film 101. The current collector 100 for an electrode according to the embodiment of the present invention may solve the above-mentioned problem as the metal piece 120 is additionally positioned on the two opposite surfaces of the base film 101 or positioned on the surface opposite to the surface to which the lead tab 190 is connected, and the lead tab 190 is welded to the metal piece 120.

According to the current collector 100 for an electrode according to the embodiment of the present invention, the lead tab 190 may be welded to the metal piece 120 by ultrasonic welding, laser welding, or spot welding.

As illustrated in FIGS. 6A and 6B, the lead tab 190 may be connected to any one of the metal pieces 120 provided on the two opposite upper and lower surfaces of the base film 101. Although not illustrated, the lead tab 190 may be connected to one surface of the base film 101, and the metal piece 120 may be provided on the other surface of the base film 101 that faces the lead tab 190. In this case, the conductive material 102 is positioned between the base film 101 and the metal piece 120 or between the base film 101 and the lead tab 190. That is, after the upper and lower surfaces of the base film 101 are coated or applied with the conductive material 102 first, the metal piece 120 may be positioned on the conductive material 102 or provided to be in contact with the conductive material 102 so that the metal piece 120 is electrically connected to the conductive material 102.

In the case in which the lead tab 190 is welded to any one of the metal pieces 120 provided on the two opposite surfaces of the base film 101, the metal pieces 120 provided on the two opposite surfaces of the base film 101 may be connected to each other as the base film 101 is melted. As a result, the lead tab 190 may be electrically connected simultaneously to the conductive materials 102 provided on the two opposite surfaces of the base film 101.

A part of the base film 101 may be melted when the lead tab 190 is coupled to the metal piece 120 provided on the upper surface of the base film 101 by ultrasonic welding, laser welding, or spot welding in the state in which the metal pieces 120 and the conductive materials 102 are provided on the two opposite upper and lower surfaces of the base film 101. When the temperature of welding heat generated at the time of welding the lead tab 190 is higher than a melting point of the base film 101, the base film 101 may be melted during the welding process.

Because no base film 101 is present at a portion where the base film 101 is melted, the upper and lower metal pieces 120 may come into direct contact with each other. In this case, because the metal pieces 120 are also melted by the welding heat, the upper and lower metal pieces 120 are joined to each other. Therefore, because the upper and lower metal pieces 120 are coupled directly to each other at the portion where the base film 101 is melted and removed, the lead tab 190 welded to any one metal piece 120 may be electrically connected not only to the upper and lower metal pieces 120, but also to the conductive materials 102 formed on the upper and lower surfaces of the base film 101.

According to the current collector for an electrode according to the embodiment of the present invention, the state in which the metal piece 120 is connected to the base film 101 is maintained even though a part of the base film 101 is melted by welding heat. Therefore, it is possible to connect the lead tab 190.

However, in some instances, the lead tab 190 may be welded to the metal piece 120 even in the state in which the base film 101 is not melted.

Meanwhile, with reference to FIGS. 5A and 5B and 6A and 6B, insulating polymer layers 130 may each be formed between the conductive material 102 and one surface of the metal piece 120 that faces the conductive material 102. The insulating polymer layer 130 serves to attach the metal piece 120 to the surface of the base film 101 or the surface of the conductive material 102 or insulate the conductive material 102 and the metal piece 120.

If the lead tab 190 is in direct contact with the conductive material 102 without the metal piece 120, the insulating polymer layer 130 may be provided between the lead tab 190 and the conductive material 102.

More accurately, the insulating polymer layer 130 may be formed between the conductive portion 102*a* and the metal piece 120 or the lead tab 120.

The insulating polymer layer 130 may be made of a material having bondability or adhesiveness. In addition, the insulating polymer layer 130 may be made of a polymer material or provided in the form of a polymer film.

In the case in which the insulating polymer layer 130 is provided in the form of a polymer film, the insulating polymer layer 130 may have a thickness smaller than 50 μm. If the thickness of the insulating polymer layer 130 is larger than 50 μm, welding may not be properly performed, and resistance may increase.

The insulating polymer layer 130 may be melted at the same temperature as the base film 101 or melted at a lower temperature than the base film 101. That is, the insulating polymer layer 130 may have the same melting point as the base film 101 or a melting point lower in temperature than a melting point of the base film 101.

The insulating polymer layer 130 may not only be made of a polymer material such as polyethylene (PE), polypropylene (PP), polyvinylidene difluoride (PVDF), polyethylene terephthalate (PET), or polyimide (PI), but also be made of a polymer material such as ethylene vinyl acetate (EVA) or acrylate-based compound having adhesive components.

The insulating polymer layer 130 may not only serve to attach the metal piece 120 or the lead tab 190 to the surface of the conductive material 102, i.e., the conductive portion 102*a* but also serve as an insulation layer. The insulating polymer layer 130 is electrically connected to the conductive material 102, i.e., the conductive portion 102*a* while being melted by welding heat at the time of welding the lead tab 190, and a part of the lead tab 190, except for the melted portion, is insulated by the insulating polymer layer 130.

In case that the portion where the lead tab 190 and the conductive material 102 are electrically connected is limited to the melted portion, the conductive material 102 corresponding to the melted portion may react to reduce or block the current in the event of an external short circuit. If the electrically connected part is large, a large amount of reaction is required, which makes it difficult to block the current. Therefore, the insulating polymer layer 130 having insulation may be provided between the conductive material 102 and the metal piece 120 or between the conductive material 102 and the lead tab 190.

With reference to FIGS. 6A and 6B, the insulating polymer layers 130 and the metal pieces 120 respectively attached to the conductive materials 102, i.e., the conductive portions 102*a* respectively provided on the two opposite surfaces of the base film 101 may be provided at the same position based on the base film 101.

During the process of welding the lead tab 190, molten points W may be formed as the insulating polymer layer 130 and the base film 101 are melted. That is, as illustrated in FIG. 6A, the lead tab 190 is welded as the insulating polymer layer 130 positioned between the metal piece 120 and the conductive portion 102*a* is melted. The electrical connection between the conductive portion 102*a* and the lead tab 190 or the metal piece 120 is implemented only by the molten point W connected as the insulating polymer layer 130 is melted.

The molten point W, which is formed as the insulating polymer layer 130 and the base film 101 are melted by heat generated during the welding process, is formed to be smaller in size than the insulating polymer layer 130. With reference to FIG. 6A, it can be seen that a size G1 of the molten point W is smaller than a width of the conductive portion 102*a*.

In case that the insulating polymer layer 130 is present as described above, the electrical connection between the conductive portion 102*a* and the lead tab 190 or the metal piece 120 is implemented only at the molten point and the current path is formed at the very small molten point at the time of welding the lead tab 190. Therefore, the portion excluding the molten point, i.e., the portion of the insulating polymer layer 130, which is not melted, may insulate the portion between the conductive portion 102*a* and the lead tab 190 or the metal piece 120. In addition, the remaining part, except for the molten point, may be exposed to the electrolyte or be in a state in which the electrolyte easily permeates into the remaining part.

In case that the insulating polymer layer 130 made of an insulating material is present, the electrical connection of the lead tab 190 is formed only on the small molten point (melted part) connected when the insulating polymer layer 130 is melted. Therefore, this configuration is advantageous in blocking the current path and improving the safety of the battery in the event of a short circuit.

In addition, at least one of the two opposite upper and lower surfaces of the base film 101 may have a structure in which there is a portion where the insulating polymer layer 130 is not attached, thereby allowing the electrolyte to easily permeate (perform impregnation). That is, the surface of the base film has a porous structure advantageous in electrolyte impregnation. Alternatively, the surface of the base film may have a structure in which the insulating polymer layer 130 is provided on any one of the metal piece 120 and the conductive material 102 only at one side of the base film 101, such that the electrolyte may permeate through a portion where no insulating polymer layer is provided. In addition, the gelling properties of the electrolyte may be advantageous in the permeation of the electrolyte.

In the case of the current collector 100 for a positive electrode according to the present invention described above, the metal piece 120 or the lead tab 190 needs to be provided on the two opposite upper and lower surfaces of the base film 101 to make electric conduction and attach the metal piece 120 and the lead tab 190 to the two opposite upper and lower surfaces of the base film 101 onto which the conductive materials 102 are applied. For example, the metal pieces need to be provided on the two opposite upper and lower surfaces of the base film. Alternatively, the metal piece needs to be provided on one surface of the base film, and the lead tab needs to be provided on the other surface of the base film. If the metal piece or the lead tab is provided only on one surface of the base film, bonding strength or tensile strength of the welded part of the lead tab is low, which makes it difficult to use the lead tab.

In addition, the insulating polymer layer 130 made of a polymer capable of being melted while making insulation needs to be provided between the metal piece 120 and the conductive material 102 or between the lead tab 190 and the conductive portion 102*a* in order to ensure performance in blocking the current path and improve safety of the battery in the event of an external short circuit. In this case, because of the insulating polymer layer 130, the electrical connection is implemented only at the molten point formed when the lead tab 190 is welded.

Meanwhile, in the secondary battery including the current collector 100 for an electrode according to the embodiment of the present invention, when an external short circuit occurs in any one of the conductive portions 102*a* separated from one another by the recessed portions 102*b*, the external short circuit does not affect another conductive portion 102*a*. This is because the current path is blocked at the molten point of the corresponding short-circuited conductive portion 102*a*. Hereinafter, the embodiment will be described in detail with reference to the drawings.

First, as illustrated in FIGS. 5A and 5B and 6A and 6B, in the current collector 100 for an electrode according to the embodiment of the present invention, the conductive portions 102*a* may each serve as an individual unit cell UC. The conductive portions 102*a* are completely separated from one another by the recessed portions 102*b*, and all the conductive portions 102*a* are connected to the single metal piece 120. Therefore, it can be said that the plurality of conductive portions 102*a*, which is distinguished by the recessed portions 102*b*, has a shape identical or equivalent to a shape in which the conductive portions 102*a* are connected in parallel to the metal piece 120 or the lead tab 190.

Therefore, the current collector 100 for an electrode according to the embodiment of the present invention has a shape in which the conductive portions 102*a*, which may perform the electrical functions of the individual current collectors, are provided as the unit cells UC and connected in parallel to the metal piece 120 or the lead tab 190.

With reference to FIG. 6A, the unit cells UC may be distinguished by the recessed portions 102*b*. The unit cell UC may include the metal piece 120, the insulating polymer layer 130, the conductive portion 102*a*, and the base film 101. In this case, the units cell UC may each include at least one molten point W.

There is a difference in that the conductive portion 102*a* and the recessed portion 102*b* of the current collector 100 for an electrode illustrated in FIG. 6A are provided symmetrically at the upper and lower sides of the base film 101 while having the same shape, whereas the conductive portion 102*a* and the recessed portion 102*b* of the current collector 100 for an electrode illustrated in FIG. 6B are provided asymmetrically.

In FIG. 6B, the position of the recessed portion 102*b*, which is formed on the upper surface of the base film 101, and the position of the recessed portion 102*b*, which is formed on the lower surface of the base film 101, are not positioned on a vertical line. In FIG. 6B, the unit cells UC may be distinguished based on the molten points W. That is, the unit cells UC may each include at least one molten point W and include the single recessed portion 102*b* positioned on the upper surface of the base film 101, and the single recessed portion 102*b* positioned on the lower surface of the base film 101.

FIG. 7A is a view for explaining a case in which an external short circuit C occurs in the conductive portion 102*a* positioned at a lowermost side of the conductive material 102. The unit cell UC including the corresponding conductive portion 102*a*, in which the external short circuit (see C1) has occurred, is electrically separated from another conductive portion by the recessed portions 102*b* formed at the two opposite sides of the corresponding conductive portion 102*a*, such that the external short circuit does not affect another conductive portion 102*a*.

When any one of the conductive portions 102*a* is short-circuited, the current path formed at the molten point W of the insulating polymer layer 130 positioned in the unit cell UC including the corresponding short-circuited conductive portion 102*a* is blocked, the short circuit does not affect another conductive portion, except for the corresponding short-circuited conductive portion 102*a*.

As illustrated in FIG. 7A, when a short circuit occurs in the conductive portion 102*a*, which is positioned at the lowermost side among the conductive portions 102*a* separated by the recessed portions 102*b*, almost all the currents in the remaining conductive portions 102*a* flow to the short-circuited conductive portion 102*a*. When the currents flowing through the remaining conductive portions 102*a* flow to the short-circuited conductive portion 102*a*, the short-current current path in the short-circuited conductive portion 102*a* is blocked. Therefore, it is possible to obtain an effect of isolating the short-circuited conductive portion 102*a* from the remaining conductive portions 102*a*.

With reference back to FIG. 7B, when short circuits (see C and C2) occur in the conductive portion 102*a*, the contact portion where the insulating polymer layer 130 is in contact with the conductive portion 102*a* is melted or the electric potential of the contact portion is decreased to near the electric potential of the negative electrode (i.e., <0.3 volts, negative electrode Li metal) by the current that is instantaneously increased because the resistance of the contact portion is high. Therefore, when the conductive material 102 reacts with the electrolyte, the conductive material 102 may be cracked as if the conductive material 102 is corroded, thereby reducing or blocking the short-circuit current. In this case, because the molten point W at which the current path is formed is very small, the thickness or amount of the conductive material 102 associated with the current path is inevitably small. When the conductive material 102, which is formed to be thin or small, is cracked finely while reacting with the electrolyte as if the conductive material 102 is corroded, the current path is blocked, such that the short-circuit current is reduced or does not flow any further.

As described above, in the current collector 100 for an electrode according to the embodiment of the present invention, because the plurality of conductive portions 102*a*, which is distinguished by the recessed portions 102*b*, is connected in parallel to the metal piece 120 or the lead tab 190, the recessed portions 102*b* formed at the two opposite sides of the short-circuited conductive portion 102*a* prevent the short-circuited conductive portion 102*a* from affecting another conductive portion. That is, because the recessed portion 102*b* prevents the short-circuit current from flowing to another conductive portion 102*a*, a side reaction occurs only in the corresponding short-circuited conductive portion 102*a*, and no side reaction occurs in the remaining conductive portions 102*a*. Therefore, the remaining unit cells UC, which are not short-circuited, may exhibit the normal functions. Therefore, it is possible to increase the lifespan of the use of the secondary battery that uses the current collector 100 for an electrode according to the embodiment of the present invention.

Furthermore, the short-circuit current is blocked as a side reaction is concentrated on the portion where the insulating polymer layer 130 is in contact with the conductive material 102 even in the unit cell UC including the corresponding short-circuited conductive portion 102*a*. Therefore, it is possible to prevent a safety accident such as an explosion or fire of the battery caused by an increase in temperature and to ensure the safety of the secondary battery.

As described above, the conductive material 102 of the current collector 100 for an electrode according to another embodiment of the present invention may exhibit the function of the electrochemical fuse or the function of blocking the short-circuit current at a portion 102*c* having a relatively small thickness, thereby preventing an increase in temperature of the battery and ensuring the safety of the battery by blocking the short-circuit current in the event of a short circuit.

FIG. 8 illustrates a modified example of the current collector for an electrode according to the embodiment of the present invention. Unlike the current collector for an electrode illustrated in FIGS. 7A and 7B, the recessed portion 102*b* may be formed in a curved shape or the like instead of a straight shape. The recessed portion 102*b* may have various shapes because the recessed portion 102*b* is formed by using a laser after the surface of the base film 101 is completely coated with the conductive material 102. However, the recessed portion 102*b* may be formed in a shape having predetermined directionality so that all the conductive portions 102*a* formed on the base film 101 may be connected to the single metal piece 120 or the single lead tab 190.

FIG. 9 illustrates a current collector 100 for an electrode according to another embodiment of the present invention. With reference to FIG. 9, there is a different in that the recessed portion is formed not only in the conductive material 102 but also in the positive electrode active material 103 applied onto the surface of the conductive material 102. When the patterning is performed by using a laser or chemical material in a state in which the positive electrode active material 103 is applied onto the conductive material 102 after the conductive material 102 is applied onto the base film 101 first, removed portions 103*b* are formed in the positive electrode active material in the patterned portion as the conductive material 102 and the positive electrode active material 103 are removed. The removed portion 103*b* formed on the positive electrode active material 103*b* is connected to the recessed portion 102*b* of the conductive material 102. In FIG. 9, reference numeral 103*a* indicates a portion where the positive electrode active material remains.

FIGS. 10 and 11A and 11B illustrate a current collector 100 for an electrode according to yet another embodiment of the present invention.

First, with reference to FIG. 10, a stepped portion 102*c*, in which a thickness of the conductive material 102 is relatively small, may be formed in the conductive material 102, i.e., the conductive portion 102*a* adjacent to one side of the metal piece 120 or the lead tab 190. That is, the stepped portion 102*c* is not a portion where the conductive material 102 is not completely present like the recessed portion 102*b*. The stepped portion 102*c* is a portion where the stepped portion 102*c* has a smaller thickness of the conductive material 102 than the conductive portion 102*a*.

In this case, as illustrated in FIG. 11A, the stepped portion 102*c* may have a quadrangular cross-sectional shape. Alternatively, as illustrated in FIG. 11B, the stepped portion 102*c* may have an inverted triangular cross-sectional shape. The stepped portion 102*c* may be formed in other shapes other than the shape illustrated in FIGS. 11A and 11B.

The stepped portion 102*c* may be formed at one side of the metal piece 120 or the lead tab 190 and formed at a portion where the conductive portion 102*a* has a relatively large area. With reference to FIG. 10, because the conductive portion 102*a* has a larger area at the left side of the metal piece 120 or the lead tab 190 than the right side of the metal piece 120 or the lead tab 190, the stepped portion 102*c* may be formed at the left side of the metal piece 120 or the lead tab 190. In this case, the stepped portion 102*c* may be formed to be maximally close to the metal piece 120 or the lead tab 190.

When a short circuit occurs in any one of the conductive portions 102*a* separated by the recessed portions 102*b*, the currents in the remaining conductive portions 102*a* flow to the short-circuited conductive portion 102*a*. When the amount of currents flowing to the short-circuited conductive portion 102*a* increases, an electrochemical reaction occurs in the stepped portion 102*c* present in the short-circuited conductive portion 102*a*, and the resistance increases, such that the short-circuit current path may be blocked. That is, because a thickness of the conductive material 102 present in the stepped portion 102*c* is relatively small, the stepped portion 102*c* may perform the function of the electrochemical fuse or the function of blocking the short-circuit current.

When a short circuit occurs in the lithium secondary battery including the current collector 100 for an electrode according to yet another embodiment of the present invention, the conductive material 102 may react with the electrolyte and be corroded or cracked in the thickness direction over the overall thickness of the conductive material 102, thereby reducing the short-circuit current or blocking the short-circuit current path.

However, in the case of the current collector 100 for an electrode according to yet another embodiment of the present invention, the stepped portion 102*c*, in which a thickness of the conductive material 102 is relatively small, is present, and the stepped portion 102*c*, which has a small thickness of the conductive material 102, is completely corroded or easily cracked in the thickness direction over the overall thickness in the event of a short circuit. As a result, the resistance increases in the stepped portion 102*c*, such that the short-circuit current path may be blocked.

As described above, the conductive material 102 of the current collector 100 for an electrode according to yet another embodiment of the present invention exhibits the function of the electrochemical fuse or the function of blocking the short-circuit current in the stepped portion 102*c* having a relatively small thickness. Therefore, it is possible to prevent an increase in temperature of the battery and ensure the safety of the battery by blocking the short-circuit current in the event of a short circuit.

Figure 12A:
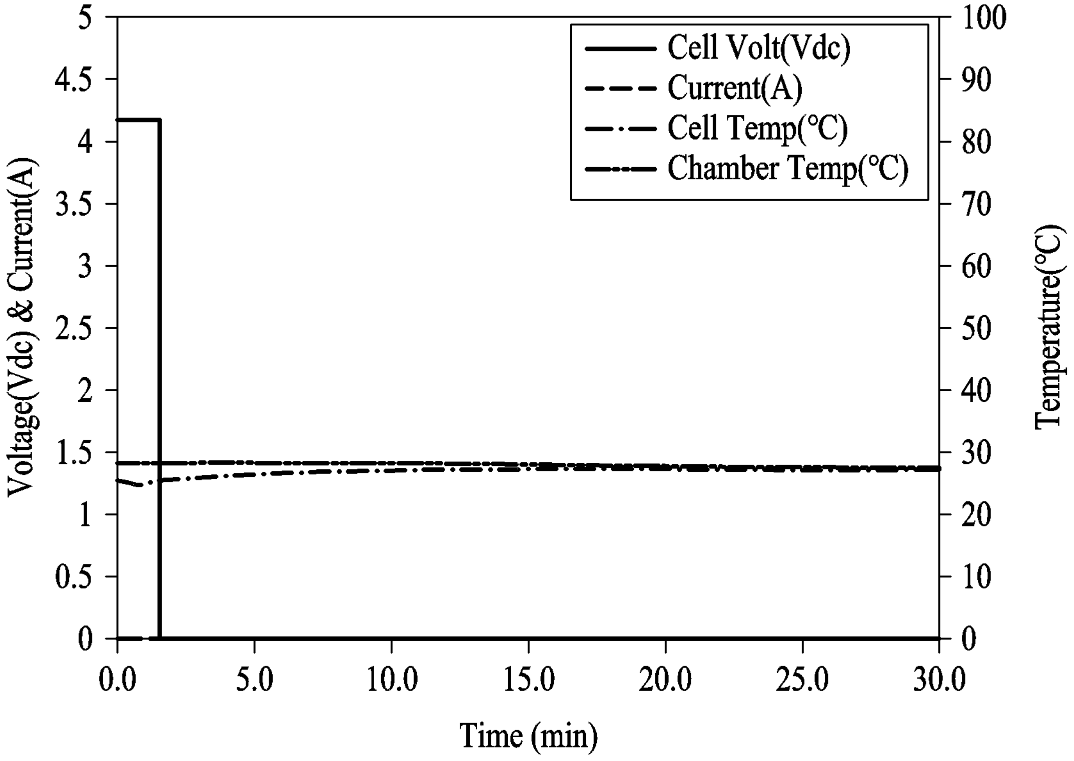
FIGS. 12A and 12B are graphs illustrating a result of reducing or blocking a short-circuit current in the event of an external short circuit of a secondary battery in accordance with a method of connecting the lead tab to the current collector for an electrode according to the present invention.
Figure 12B:
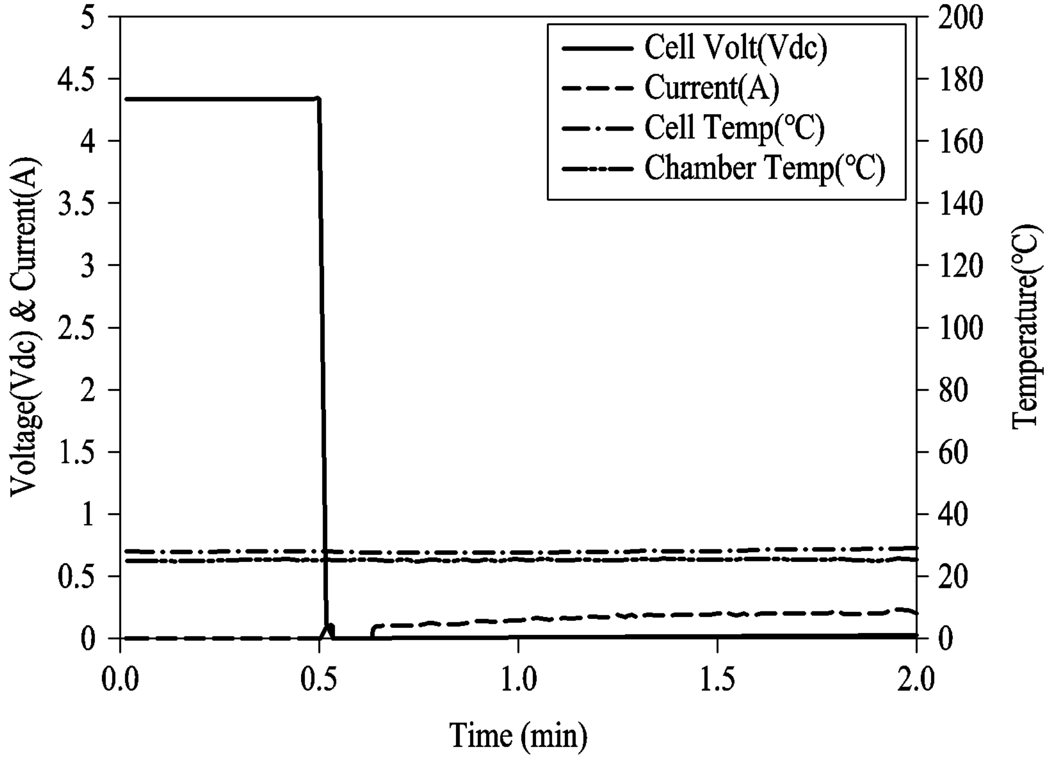

Meanwhile, FIGS. 12A and 12B are graphs illustrating a result of reducing or blocking a short-circuit current in the event of an external short circuit of the secondary battery in accordance with a method of connecting the lead tab to the current collector for an electrode according to the present invention.

FIG. 12A illustrates a test result on an external short circuit of the secondary battery using the current collector 100 for an electrode having the stepped portion 102*c* formed in the conductive portion 102*a*, as illustrated in FIGS. 10 and 11A and 11B. The current collector 100 for an electrode was used, in which PET with a thickness of 7 μm was used for the base film 101, EVA with a thickness of 6 μm was used for the insulating polymer layer 130, the insulating polymer layer 130 was provided on the upper and lower surfaces of the base film 101, and the conductive material 102 made of aluminum with a thickness of 0.5 μm was applied by sputtering. In this case, the thickness of the stepped portion 102*c* was set to be less than 50% of the thickness of the aluminum conductive material 102. An external short circuit test was performed on the aluminum pouch secondary battery using copper foil (Cu foil) with a thickness of 8 μm as a negative electrode current collector and using EC/EMC=½ (v/v) 1.1 M LiPF6 (with added some additives) as an electrolyte. The secondary battery was fully charged first to 4.2 V and then subjected to the external short circuit test by connecting a 60 mOhm resistor at room temperature.

With reference to FIG. 12A, it can be seen that the temperature (Cell Temp) of the battery hardly changes and no overheating occurs even when an external short circuit occurs.

FIG. 12B illustrates a test result on an external short circuit of the secondary battery using the current collector 100 for an electrode according to the embodiment of the present invention having the recessed portion 102*b* formed in the conductive portion 102*a*, as illustrated in FIGS. 3 to 8. The current collector 100 for an electrode was used, in which PET with a thickness of 7 μm was used for the base film 101, and the conductive material 102 made of aluminum with a thickness of 0.5 μm was applied by sputtering. An external short circuit test was performed on the aluminum pouch secondary battery using copper foil (Cu foil) with a thickness of 8 μm as a negative electrode current collector and using EC/EMC=½ (v/v) 1.1 M LiPF6 (with added some additives) as an electrolyte. To connect the current collector 100 for an electrode and the lead tab 190, the insulating polymer layers 130, which was made of polyethylene (PE) with a thickness of 5 μm, were placed on the two opposite upper and lower surfaces of the base film 101, the aluminum metal piece 120 of 12 μm was placed on one of the insulating polymer layers 130, the lead tab 190 was placed on the other of the insulating polymer layers 130, and the lead tab 190 was connected by ultrasonic welding. The secondary battery, which was formed as described above and had a capacity of 550 mAh, was fully charged first to 4.35 V and then subjected to the external short circuit test by connecting a 60 mOhm resistor at room temperature.

With reference to FIG. 12B, it can be seen that the temperature (Cell Temp) of the battery hardly changes and no overheating occurs even when an external short circuit occurs.

While the exemplary embodiments of the present invention have been described above with reference to particular contents such as specific constituent elements, the limited exemplary embodiments, and the drawings, but the exemplary embodiments are provided merely for the purpose of helping understand the present invention overall, and the present invention is not limited to the exemplary embodiment, and may be variously modified and altered from the disclosure by those skilled in the art to which the present invention pertains. Accordingly, the spirit of the present invention should not be limited to the described embodiment, and all of the equivalents or equivalent modifications of the claims as well as the appended claims belong to the scope of the spirit of the present invention.

The invention claimed is:

1. A current collector for an electrode, the current collector comprising:
- a base film;
- a conductive layer comprising a conductive material provided on at least one of upper and lower surfaces of the base film,
- wherein the conductive layer comprises:
  - one or more recessed portions extending across an entirety of the conductive material in a length direction or a width direction of the base film, the conductive material being absent from each recessed portion; and
  - one or more conductive portions extending in the length direction or the width direction of the base film and alternately arranged with the one or more recessed portions, the conductive material being present in each conductive portion,
- a metal piece or a lead tab disposed in a direction intersecting each conductive portion and each recessed portion and contacting each conductive portion; and
- an insulating polymer layer disposed between the metal piece or the lead tab and each conductive portion,
- wherein the insulating polymer layer comprises a melted portion and a non-melted portion,
- wherein the melted portion defines a molten point at which the metal piece or the lead tab is electrically connected to each conductive portion,
- wherein the non-melted portion electrically insulates the metal piece or the lead tab from each conductive portion,
- wherein the molten point has an area smaller than an area of the non-melted portion of the insulating polymer layer and smaller than a width of each conductive portion, wherein the molten point defines a localized current path between the metal piece or the lead tab and each conductive portion, wherein a portion of the insulating polymer layer excluding the molten point is exposed to an electrolyte or is configured to allow permeation of the electrolyte, and wherein adjacent conductive portions of the one or more conductive portions are electrically separated from one another by one of the one or more recessed portions and are connected in parallel to the metal piece or the lead tab.

2. The current collector of claim 1, wherein each conductive portion and each recessed portion are formed symmetrically or asymmetrically on the upper and lower surfaces of the base film.

3. The current collector of claim 2, wherein the base film is made of a transparent material.

4. The current collector of claim 1, wherein the insulating polymer layer has a melting point equal to a melting point of the base film or lower than the melting point of the base film.

5. The current collector of claim 4, wherein the base film and the insulating polymer layer are melted by heat and attach the metal piece or the lead tab to each conductive portion, and a portion of the insulating polymer layer excluding the melted part insulates a portion between each conductive portion and the metal piece or the lead tab.

6. The current collector of claim 5, wherein an electrical connection between each conductive portion and the lead tab or the metal piece is implemented only at the molten point formed as the insulating polymer layer is melted, wherein a portion of the insulating polymer layer, which is not melted, insulates the portion between each conductive portion and the lead tab or the metal piece, wherein the molten point is formed to be smaller than the portion of the insulating polymer layer that is not melted, and wherein a current path is formed through the molten point.

7. The current collector of claim 6, wherein when an external short circuit occurs in any one of the conductive portions separated by one of the one or more recessed portions, the current path, which is formed through the molten point formed as the insulating polymer layer being in contact with the external short-circuited conductive portion is melted, is blocked, such that the external short circuit does not affect the other conductive portions of the one or more conductive portions, except for the external short-circuited conductive portion.

8. The current collector of claim 6, wherein when a short circuit occurs in any one of the one or more conductive portions, the short-circuited conductive portion is electrically separated from another conductive portion of the one or more conductive portions by one recessed portion of the one or more recessed portions formed at two opposite sides of the short-circuited conductive portion.

9. The current collector of claim 4, wherein the one or more conductive portions, which are separated by the one or more recessed portions, are connected in parallel to the metal piece or the lead tab so that the one or more recessed portions, which are formed at two opposite sides of the short-circuited conductive portion, prevent the short circuit from affecting another conductive portion of the one or more conductive portions.

10. The current collector of claim 4, wherein a stepped portion, which has a smaller thickness of the conductive material than a thickness of the one or more conductive portions, is formed in each of the conductive portions at one side of the metal piece or the lead tab, wherein, when an external short circuit occurs, the stepped portion is corroded or fractured in a thickness direction across an entire thickness thereof, thereby increasing resistance at the stepped portion and interrupting a short-circuit current path.

11. The current collector of claim 6, wherein each of the one or more conductive portions is completely separated by each of the one or more recessed portions, and all of the one or more conductive portions are connected to a same one metal piece so that the one or more conductive portions divided by the one or more recessed portions have a structure identical or equivalent to a structure in which all of the one or more conductive portions are connected in parallel to the metal piece or the lead tab.

12. The current collector of claim 6, wherein the metal piece, the insulating polymer layer, each of the one or more conductive portions, and the base film arranged in a thickness direction of the current collector form a unit cell, and wherein the unit cell comprises at least one molten point, or comprises at least one molten point and one recessed portion of the one or more recessed portions positioned on the upper surface of the base film and another recessed portion of the one or more recessed portions positioned on the lower surface of the base film.

13. The current collector of claim 12, wherein when an external short circuit occurs in one of the one or more conductive portions, the unit cell including the short-circuited conductive portion is electrically separated from another conductive portion of the one or more conductive portions by one or more of the recessed portions formed at opposite sides of the short-circuited conductive portion, such that the external short circuit does not affect the another conductive portion, or the localized current path formed at the molten point positioned in the unit cell including the short-circuited conductive portion is interrupted, such that the external short circuit does not affect the another conductive portion except for the short-circuited conductive portion.

* * * * *